US00RE35526E

United States Patent [19]

Alvarez Garcia

[11] E Patent Number: Re. 35,526

[45] Reissued Date of Patent: Jun. 10, 1997

[54] METHOD AND APPARATUS FOR MANUFACTURING PAINT ROLLER AND PRODUCT PRODUCED THEREBY

[75] Inventor: Jaime Alvarez Garcia, Barcelona, Spain

[73] Assignee: Newell Operating Company, Freeport, Ill.

[21] Appl. No.: 578,954

[22] Filed: Dec. 27, 1995

Related U.S. Patent Documents

Reissue of:

[64] Patent No.: 5,273,604
Issued: Dec. 28, 1993
Appl. No.: 871,889
Filed: Apr. 21, 1992

U.S. Applications:

[63] Continuation of Ser. No. 489,398, Mar. 6, 1990, abandoned.

[30] Foreign Application Priority Data

Mar. 7, 1989 [ES] Spain ..... 8900821

[51] Int. Cl.[6] ..... B05C 17/02

[52] U.S. Cl. ..... 156/187; 15/230.12; 156/446; 492/48

[58] Field of Search ..... 156/195, 187, 156/188, 446; 15/230.11, 230.12; 492/48, 56

[56] References Cited

U.S. PATENT DOCUMENTS

| | | | |
|---|---|---|---|
| 2,812,007 | 11/1957 | Touchett | 156/187 X |
| 3,366,719 | 1/1968 | Leuders | 264/47 X |
| 3,401,073 | 9/1968 | Wood | 156/187 X |
| 4,038,731 | 8/1977 | Hill | 29/132 |
| 4,078,957 | 3/1978 | Bradt | 156/173 X |
| 4,121,962 | 10/1978 | Hopkins | 156/272 X |
| 4,191,792 | 3/1980 | Jansen | 427/260 X |
| 4,192,697 | 3/1980 | Parker | 156/195 X |
| 4,211,595 | 7/1980 | Somour | 156/195 X |
| 4,338,147 | 7/1982 | Backstrom | 156/187 |
| 4,372,796 | 2/1983 | Gruel | 156/187 |
| 4,434,521 | 3/1984 | Martin | 15/230.11 |
| 4,544,426 | 10/1985 | Stockman | 156/73.6 X |
| 4,692,975 | 9/1987 | Garcia | 156/187 X |
| 4,937,909 | 7/1990 | Georgiou | 15/230.11 |
| 5,001,804 | 3/1991 | Roecker | 15/230.12 |

FOREIGN PATENT DOCUMENTS

| | | | |
|---|---|---|---|
| 2093060 | 1/1972 | France | 156/195 |
| 61-15816 | 4/1986 | Japan | 15/230.11 |

*Primary Examiner*—James Engel
*Attorney, Agent, or Firm*—Baker & McKenzie

[57] ABSTRACT

The invention consists of applying thermoplastic adhesive in a molten state in the area where a strip of pile fabric is wound onto a plastic tube which is mounted over a rotating roller. The molten thermoplastic adhesive is applied by a nozzle connected to a reservoir where the thermoplastic adhesive is heated After application, the adhesive, the strip of pile fabric and the plastic tube are joined together, forming a structurally integral paint roller body.

1 Claim, 1 Drawing Sheet

METHOD AND APPARATUS FOR MANUFACTURING PAINT ROLLER AND PRODUCT PRODUCED THEREBY

Matter enclosed in heavy brackets [ ] appears in the original patent but forms no part of this reissue specification; matter printed in italics indicates the additions made by reissue.

This application is a continuation of U.S. patent application Ser. No. 07/489,398, filed Mar. 6, 1990, now abandoned, which application claims the benefit of the filing date pursuant to 35 U.S.C. 119 of the Spanish application Ser. No. 8900821 filed Mar. 7, 1989.

BACKGROUND OF THE INVENTION

Currently in the manufacture of paint rollers, strips of pile fabric are used which are wound around a plastic or cardboard tube or core. More specifically, among the devices currently employed is a type of machine illustrated in Spanish Utility Model No. 293.980, which machine includes of a rotating cylinder over which the plastic or cardboard tube is mounted, and onto which a strip of pile fabric is applied through a guide oriented obliquely and situated on and carried by a carriage which is mounted in fixed fashion over a sliding apparatus. The bonding of the plastic tube and strip of pile fabric is accomplished either by the application of adhesive material or by the use of a plastic tube which, when heated by means of gas burners, bonds to the strip of pile fabric, thereby forming a single body.

In the first case, i.e., where conventional adhesive is used as the means of bonding between the tube and strip of pile fabric, the manufacture of paint rollers presents significant problems, all resulting from the difficulty of applying the adhesive uniformly, plus the fact that very specific adhesives must be used to produce the bond between the tube and the strip of pile fabric so that, when the rollers are used, these adhesives do not separate due to the solvents contained in the paint and in the fluids used to clean the roller.

These problems considerably increase the cost of manufacturing paint rollers because the cost of the adhesives and the time needed for the adhesives to harden.

The second system mentioned above, though a significant advance in the art over what had been earlier used, does present certain problems, all resulting from the increased safety costs required by installations that use gas. Further, the heating of the plastic tube can produce undesirable products of combustion and high noise, both effects being potentially harmful for the operations and expensive to eliminate; all of this therefore has the result of raising the cost of the final product.

SUMMARY OF THE INVENTION

The object of the present invention is a procedure for manufacturing paint rollers of the type in which a strip of pile fabric is wound helically over a plastic tube, with the interposition of a thermoplastic adhesive in a molten state, with the result that the strip of pile fabric and the plastic tube form a single paint roller body.

Specifically, the thermoplastic adhesive, which may be polypropylene, in a molten state is applied onto the plastic tube in the area adjacent to the area of the winding of the strip through a nozzle connected to a reservoir where the thermoplastic adhesive is heated, which nozzle is mounted on the carriage on which the pile fabric strip applicator is also located.

Another object of the present invention is the provision of a paint roller which is structurally integral as a result of the bonding of the thermoplastic adhesive with the strip of the pile fabric and the plastic tube.

DESCRIPTION OF THE DRAWING

The invention is illustrated more or less diagrammatically in the accompanying drawing wherein.

DESCRIPTION OF THE PREFERRED EMBODIMENT

Figure 1:
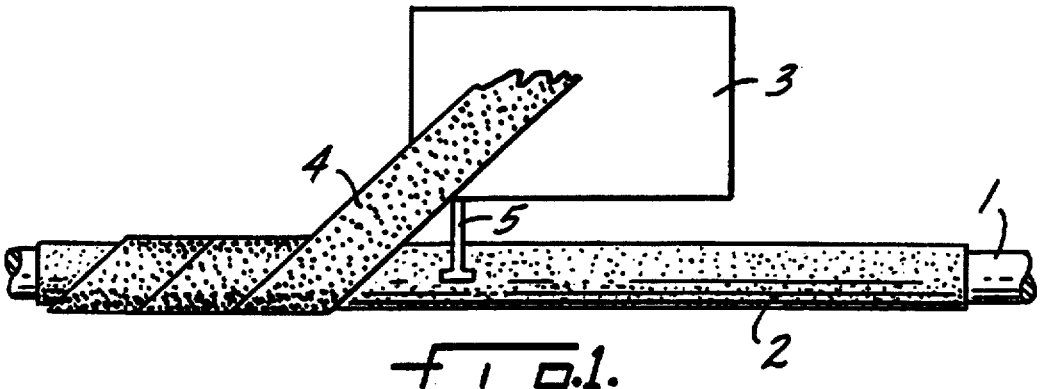
FIG. 1 is a plan view of the plastic tube mounted over the rotating roller and the strip of pile fabric being wound helically and the movable carriage on which are situated the applicator of the pile fabric strip and the nozzle for applying the thermoplastic adhesive in a molten state.

The procedure for manufacturing paint rollers that is the object of the present invention includes the use of a machine that has a rotating roller 1 on which the plastic tube 2 is mounted. The machine also has a carriage 3 which, in FIG. 1, is movable parallel to the longitudinal axis of the rotating roller. The carriage 3 includes a feed mechanism for pile fabric strip 4 to be helically wound around the plastic tube 2.

The procedure consists of a first operative phase in which the plastic tube 2 is mounted over the rotating roller 1 and a second operative phase in which the strip of pile fabric 4 is wound helically over the plastic tube 2 through the applicator located on the movable carriage 3.

The fundamental characteristics of the present procedure for the manufacture of paint rollers consists of applying onto the area of the plastic tube 2 where the strip 4 will be closely wound a thermoplastic adhesive in a molten state. It will be understood that the specific thermoplastic adhesive material applied to the junction region between the tube and fabric is not critical to the invention. It need only be compatible with the plastic tube selected, and the pile fabric. It is applied by the outlet mouth of the nozzle 5 mounted over the movable carriage 3, which nozzle 5 is connected to a reservoir where the thermoplastic adhesive is heated.

Figure 2:
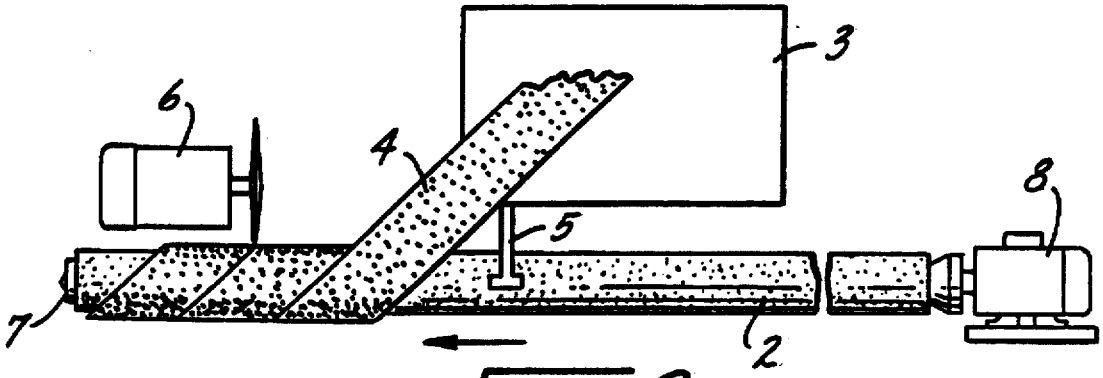
FIG. 2 is a plan view of the plastic tube mounted on a rotating roller and movable longitudinally by means of a drive unit, and wherein the strip of pile fabric is wound helically, and the fixed carriage on which the applicator of the thermoplastic adhesive in a molten state is located.
Figure 3:
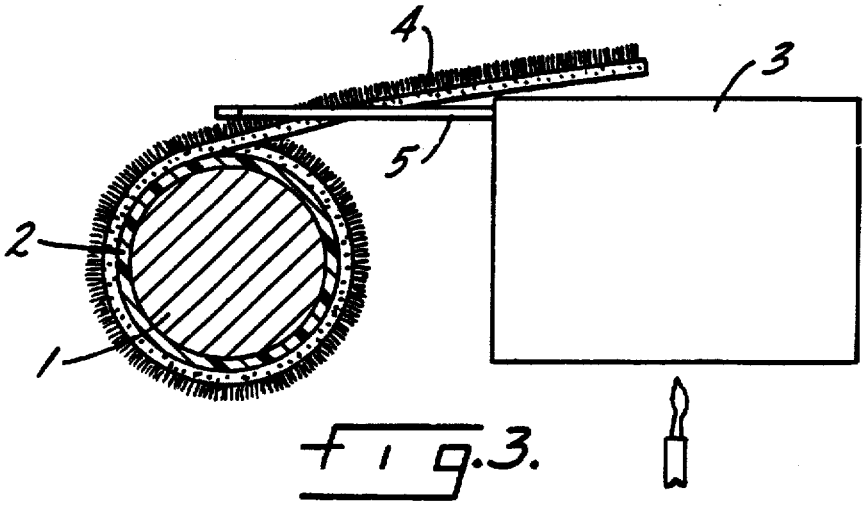
FIG. 3 is a sectional view of either of the above Figures showing a section of the roller already constructed, wherein the strip of pile fabric, the thermoplastic adhesive and the plastic tube form a single body.

In the embodiment of FIG. 2, the plastic tube 2 is mounted over a rotating roller 7. The plastic tube may be moved longitudinally by a drive unit 8, while the carriage 3 and the rotating roller 7 remains axially fixed.

In both cases, the system includes a cutter 6 which produces the roller units in a condition ready for the subsequent assembly of the handle, axis and cap. In the embodiment of FIG. 1, the cutter 6 does not move horizontally when cutting In the embodiment of FIG. 2 it will be understood that the cutter 6 will be arranged to move in synchronism with the horizontal movement of the tube 2 when cutting.

The system produces a paint roller comprised of a structurally integral element due to the bonding produced between the plastic tube 2 and the strip of pile fabric 4, together with the interposition of the compatible thermoplastic adhesive which has been heated to a temperature capable of forming a strong bond. The exact temperature will of course vary slightly from material to material and other factors unique to a specific operation as will be readily apparent to one skilled in the art.

With this procedure, the high expenditures that must be incurred for the safety measures that are currently required when gas installations are used in the manufacture of this type of roller are avoided; also, the disagreeable products of combustion and elevated noise level which can be potentially harmful for operation are eliminated since the thermoplastic adhesive is heated in an independent reservoir that may be located at a considerable distance from the site where the rollers are manufactured.

Although a preferred embodiment of the invention has been illustrated and described it will at once be apparent to those skilled in the art that modifications and improvements may be made within the scope of the invention. Accordingly it is intended that the scope of the invention not be limited by the foregoing exemplary description, but only by the hereafter appended claims when interpreted in view of the relevant prior art.

I claim:

1. In a continuous method of producing a structurally integrated paint roller, the steps of, providing a thermoplastic paint roller core compatible with polypropylene, presenting a thermoplastic fabric in strip form to the paint roller core, said fabric having a backing compatible with polypropylene, providing a supply of polypropylene which is compatible with both the paint roller core and the strip fabric and which is capable of functioning, upon application of heat, as an adhesive, heating said supply of polypropylene to a temperature at which it becomes a liquid adhesive, applying said hot liquid polypropylene to the rotating core immediately prior to the placement of the strip on the core in an amount sufficient to securely bond the strip to the core so as to yield a structurally integral product, and wrapping said fabric while said polypropylene is in hot molten adhesive condition about the core and said fabric and core are rotating with respect to each other.

* * * * *